United States Patent
Ho et al.

(10) Patent No.: US 10,115,426 B1
(45) Date of Patent: Oct. 30, 2018

(54) OPTICAL DISC AND METHOD FOR JUDGING WHETHER OPTICAL DISC IS PLACED REVERSELY

(71) Applicant: LITE-ON TECHNOLOGY CORPORATION, Taipei (TW)

(72) Inventors: Yu-Ta Ho, Taipei (TW); Chou-Chien Chien, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/936,949

(22) Filed: Mar. 27, 2018

Related U.S. Application Data (62) Division of application No. 15/723,271, filed on Oct. 3, 2017, now Pat. No. 10,056,104.

(30) Foreign Application Priority Data

Jul. 6, 2017 (CN) .......................... 2017 1 0546586

(51) Int. Cl.
*G11B 7/24* (2013.01)
*G11B 7/12* (2012.01)
*G11B 7/007* (2006.01)

(52) U.S. Cl.
CPC .................. *G11B 7/24* (2013.01); *G11B 7/12* (2013.01); *G11B 7/007* (2013.01)

(58) Field of Classification Search
None
See application file for complete search history.

(56) References Cited

U.S. PATENT DOCUMENTS

| 7,151,734 B2 * | 12/2006 | Cookson | G11B 7/14 369/94 |
| 7,512,048 B2 * | 3/2009 | Cookson | G11B 7/14 369/47.39 |
| 2005/0105456 A1 * | 5/2005 | Cookson | G11B 7/007 369/275.3 |
| 2005/0105457 A1 * | 5/2005 | Cookson | G11B 7/007 369/275.3 |
| 2005/0111334 A1 * | 5/2005 | Cookson | G11B 7/24038 369/94 |

FOREIGN PATENT DOCUMENTS

| WO | WO-2005050634 A1 * | 6/2005 | ............. G11B 7/007 |
| WO | WO-2005052916 A2 * | 6/2005 | ............ G11B 7/0037 |
| WO | WO-2005052919 A2 * | 6/2005 | ......... G11B 7/24038 |
| WO | WO-2005052921 A2 * | 6/2005 | ......... G11B 7/24038 |
| WO | WO-2005052922 A2 * | 6/2005 | ............... G11B 7/14 |

* cited by examiner

*Primary Examiner* — William J Klimowicz
(74) *Attorney, Agent, or Firm* — WPAT, PC (57) ABSTRACT

A method is provided for judging whether a double-sided optical disc is placed reversely. Firstly, the disc is loaded. Then, a first optical pickup head emits a first laser beam to a first specified area of the disc and receives a first reflected laser beam. A second optical pickup head emits a second laser beam to a second specified area of the disc and receives a second reflected laser beam. If the first reflected laser beam generates an alternate brightness and darkness change and the second reflected laser beam does not generate the alternate brightness and darkness change, the disc is not placed reversely. If the first reflected laser beam does not generate the alternate brightness and darkness change and the second reflected laser beam generates the alternate brightness and darkness change, the disc is placed reversely.

6 Claims, 5 Drawing Sheets

OPTICAL DISC AND METHOD FOR JUDGING WHETHER OPTICAL DISC IS PLACED REVERSELY

This is a divisional application of co-pending U.S. application Ser. No. 15/723,271, filed Oct. 3, 2017, which claims the benefit of People's Republic of China Patent Application No. 201710546586.5, filed Jul. 6, 2017, the subject matter of which is incorporated herein by reference.

FIELD OF THE INVENTION

The present invention relates to an optical disc and an associated judging method, and more particularly to an optical disc and a method for judging whether the optical disc is placed reversely.

BACKGROUND OF THE INVENTION

As known, an optical disc drive is used to read data from an optical disc or write data into the optical disc. Conventionally, the optical disc has two layers, i.e., a label layer and a data layer. Since the label layer does not record data, the user may write characters or marks on the label layer with a pen. The data layer is used for recording digital data.

Generally, the optical disc drive has an optical pickup head. For accessing the data of the optical disc, the optical disc is firstly loaded into the optical disc drive. When the optical disc is loaded into the optical disc drive, the data layer of the optical disc faces the optical pickup head. After the optical disc is rotated by a spindle motor, the laser beam emitted by the optical pickup head can access the digital data on the data layer of the optical disc.

As mentioned above, the optical disc has the label layer for identification so that when the optical disc is loaded into the optical disc drive, it is difficult to reversely place the optical disc in the optical disc drive. And the data of the optical disc can be accessed when the optical disc is rotated in a single direction.

SUMMARY OF THE INVENTION

An embodiment of the present invention provides a method for judging whether a double-sided optical disc is placed reversely into an optical disc drive. The optical disc drive includes a first control module and a second control module. The first control module includes a first optical pickup head. The second control module includes a second optical pickup head. The method includes the following steps. Firstly, the double-sided optical disc is loaded. Then, the first optical pickup head of the first control module emits a laser beam to a specified area of the double-sided optical disc and receives a reflected laser beam from the specified area. If the reflected laser beam generates an alternate brightness and darkness change, the double-sided optical disc is not placed reversely. If the reflected laser beam does not generate the alternate brightness and darkness change, the double-sided optical disc is placed reversely.

Another embodiment of the present invention provides a method for judging whether a double-sided optical disc is placed reversely into an optical disc drive. The optical disc drive includes a first control module and a second control module. The first control module includes a first optical pickup head. The second control module includes a second optical pickup head. The method includes the following steps. Firstly, the double-sided optical disc is loaded. Then, the first optical pickup head of the first control module emits a first laser beam to a first specified area of the double-sided optical disc and receives a first reflected laser beam from the first specified area. Then, the second optical pickup head of the second control module emits a second laser beam to a second specified area of the double-sided optical disc and receives a second reflected laser beam from the second specified area. If the first reflected laser beam generates an alternate brightness and darkness change and the second reflected laser beam does not generate the alternate brightness and darkness change, the double-sided optical disc is not placed reversely. If the first reflected laser beam does not generate the alternate brightness and darkness change and the second reflected laser beam generates the alternate brightness and darkness change, the double-sided optical disc is placed reversely.

A further embodiment of the present invention provides an optical disc with a first side and a second side. The first side includes a first specified area and a first data layer. The first data layer includes a first spiral track. The second side includes a second specified area and a second data layer. The second data layer includes a second spiral track. A spiral direction of the first spiral track and a spiral direction of the second spiral track are opposite to each other. A specified information is recorded on the first specified area. The specified information is not recorded on the second specified area.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

For storing more data, an optical disc with plural data layers has been introduced into the market. For example, a double-sided optical disc comprises two data layers on a front side and a rear side, respectively. In other words, the double-sided optical disc has no label layer for the user to write characters or marks thereon.

Figure 1A:
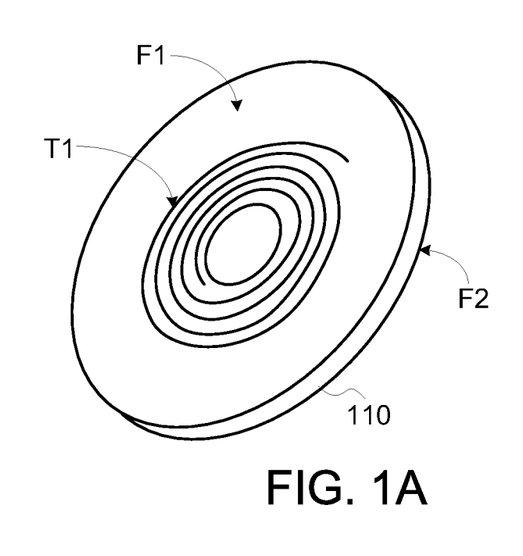
FIG. 1A is a schematic view illustrating a typical double-sided optical disc.
Figure 1B:
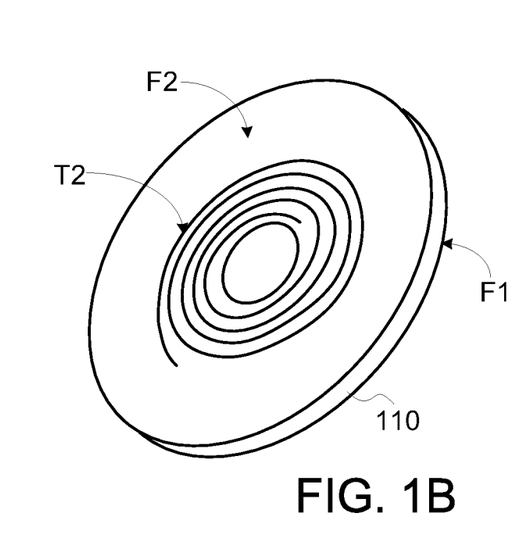
FIG. 1B is a schematic view illustrating the double-sided optical disc of FIG. 1A and taken along another viewpoint.

FIG. 1A is a schematic view illustrating a typical double-sided optical disc. FIG. 1B is a schematic view illustrating the double-sided optical disc of FIG. 1A and taken along another viewpoint. The double-sided optical disc 110 has a front side and a rear side, which are also referred as a first side and a second side. The first side has a first data layer F1. The second side has a second data layer F2. Moreover, the first data layer F1 has a first spiral track T1, and the second data layer F2 has a second spiral track T2. The spiral direction of the first spiral track T1 and the spiral direction of the second spiral track T2 are opposite to each other. For example, if the first spiral track T1 of the first data layer F1 is a clockwise spiral track, the second spiral track T2 of the second data layer F2 is a counterclockwise spiral track.

For accessing the digital data of the double-sided optical disc more quickly, the present invention provides an optical disc drive with two optical pickup heads to access the two data layers of the double-sided optical disc simultaneously.

Figure 2:
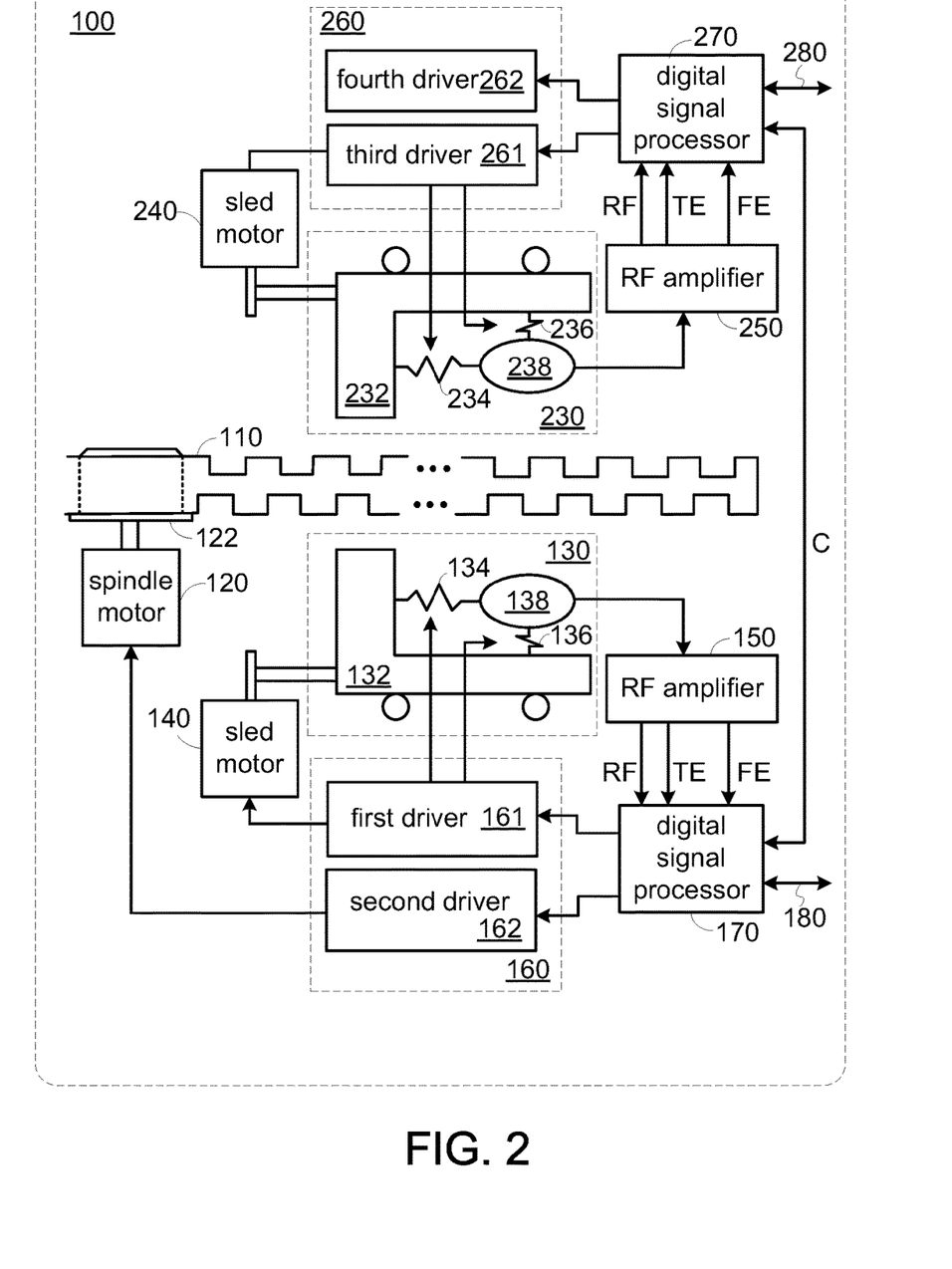
FIG. 2 is a schematic functional block diagram illustrating the architecture of an optical disc drive according to an embodiment of the present invention.

FIG. 2 is a schematic functional block diagram illustrating the architecture of an optical disc drive according to an embodiment of the present invention. The optical disc drive 100 comprises a spindle motor 120. The spindle motor 120 comprises a turn table 122. Moreover, the optical disc 110 having a center hole is placed on the turn table 122. The spindle motor 120 is used for driving rotation of the turn table 122 and the optical disc 110 in a clockwise direction or a counterclockwise direction. In this embodiment, the optical disc 110 is a double-sided optical disc.

The optical disc drive 100 comprises two control modules. The first control module is used for accessing the data of the first data layer F1 of the optical disc 110. The second control module is used for accessing the data of the second data layer F2 of the optical disc 110. For example, the first control module comprises an optical pickup head 130, a sled motor 140, a radio frequency (RF) amplifier 150, a driving circuit 160 and a digital signal processor 170.

A sled 132 of the optical pickup head 130 comprises a tracking coil 134 and a focusing coil 136. The tracking coil 134 is used for driving a tiny movement of a lens 138 in a radial direction. The focusing coil 136 is used for driving a tiny movement of the lens 138 in a focusing direction. The sled motor 140 is used for driving a long-distance movement of the sled 132 in the radial direction.

When the optical pickup head 130 accesses the optical disc 110, a weak electronic signal is generated and transmitted to the RF amplifier 150. By the RF amplifier 150, the electronic signal is processed into a radio frequency signal RF, a tracking error signal TE, a focusing error signal FE and other output signals. These signals are further processed and employed by the back-end digital signal processor 170.

According to the changes of the tracking error signal TE and the focusing error signal FE, the digital signal processor 170 controls a first driver 161 of the driving circuit 160 to generate three driving signals. According to three driving signals, the corresponding driving forces are outputted to drive the sled motor 140, the tracking coil 134 and the focusing coil 136. Consequently, the optical pickup head 130 is located at the proper focusing position and moved to the desired track along the radial direction of the optical disc 110.

The lens 138 is movable upwardly or downwardly relative to the sled 132 within a movable range. When the optical disc 110 is loaded into the optical disc drive 100, the digital signal processor 170 controls the focusing operation of the first driver 161 according to the focusing error signal FE. While the focusing operation is performed, the focusing coil 136 is driven to concentrate the focus of the lens 138 on the first data layer F1 of the first side of the optical disc 110 and then a close-loop control mechanism is implemented according to the focusing error signal FE. Consequently, the focus of the lens 138 is stably located on the first data layer F1 of the optical disc 110.

Moreover, under the control of the digital signal processor 170, a second driver 162 of the driving circuit 160 output a driving signal for driving the spindle motor 120 to generate a proper driving force. Consequently, the optical disc 110 is rotated at a proper operating speed, and the spindle motor 120 is rotated in the clockwise direction or the counterclockwise direction.

After the focus of the lens 138 is stably located on the first data layer F1 of the optical disc 110, the optical disc drive 100 controls the optical pickup head 130 to jump to the target track to read data. When the lens 138 is moved to a position near the target track, the optical disc drive 100 performs a tracking-on operation. While the tracking-on operation is performed, a close-loop control mechanism is implemented according to the tracking error signal TE. Consequently, the focus of the lens 138 is stably located on the target track of the optical disc 110. Then, the optical disc drive 100 accesses the data of the first data layer F1 of the optical disc 110.

The second control module of the optical disc drive 100 comprises an optical pickup head 230, a sled motor 240, a RF amplifier 250, a driving circuit 260 and a digital signal processor 270. The optical pickup head 230 comprises a sled 232, a tracking coil 234, a focusing coil 236 and a lens 238. The driving circuit 260 comprises a third driver 261 and a fourth driver 262. In comparison with the first control module, the fourth driver 262 of the second control module is not connected with the spindle motor 120. The operations of the other components of the second control module are similar to those of the first control module, and are not redundantly described herein. In some embodiment, the driving circuit 260 of the second control module is not equipped with the fourth driver 262. Under this circumstance, the digital signal processor 270 does not provide signals to the fourth driver 262.

The digital signal processor 170 of the first control module and the digital signal processor 270 of the second control module are connected with an external host (not shown) through respective buses 180 and 280. That is, the host is connected with the buses 180 and 280 of the optical disc drive 100. Consequently, the host recognizes the presence of two optical disc drives. Moreover, the host issues respective control commands through the buses 180 and 280 in order to access the data of two opposed sides of the same optical disc 110.

As mentioned above, the two control modules are included in the housing of one optical disc drive 100 and connected with the external host through the buses 180 and 280. Consequently, the host recognizes the presence of two optical disc drives. After the host recognizes that the host is connected with two optical disc drives, the host issues respective control commands through the buses 180 and 280 in order to access the data of two opposed sides of the same optical disc 110. That is, the host issues a control command through the bus 180 to access the data of the first data layer F1 of the optical disc 110, and the host issues another control command through the bus 280 to access the data of the second data layer F2 of the optical disc 110.

In accordance with a feature of the present invention, the spindle motor 120 of the optical disc drive 100 is controlled by one of the two control modules. In the embodiment of FIG. 1, the spindle motor 120 is controlled by the second driver 162 of the driving circuit 160 of the first control module.

Moreover, the digital signal processor 170 of the first control module and the digital signal processor 270 of the second control module communicate and coordinate with each other through a negotiation signal C.

For example, after the double-sided optical disc 110 is loaded, the first data layer F1 of the first side faces the optical pickup head 130 of the first control module and the second data layer F2 of the second side faces the optical pickup head 230 of the second control module. Moreover, the first control module and the second control module are enabled according to the negotiation signal C. Meanwhile, the first control module receives and executes the control command from the host through the bus 180, and the second control module receives and executes the control command from the host through the bus 280. Moreover, the first control module and the second control module confirm the rotation speed of the optical disc 110 according to the negotiation signal C.

After the first control module and the second control module confirm the rotation speed of the optical disc 110 according to the negotiation signal C, the second driver 162 of the driving circuit 160 of the first control module controls the rotation of the spindle motor 120 in the clockwise direction. Consequently, the optical pickup head 130 of the first control module and the optical pickup head 230 of the second control module access the data of the first data layer F1 and the second data layer F2 simultaneously.

For example, if the first control module intends to rotate the optical disc 110 at a first rotation speed (e.g., 16 times speed) and the second control module intends to rotate the optical disc 110 at a second rotation speed (e.g., 32 times speed), one of the first rotation speed and the second rotation speed is selected as a target rotation speed according to the negotiation signal C. For example, if the higher rotation speed (e.g., the second rotation speed) is selected as the target rotation speed, the first control module controls the spindle motor 120 to rotate the optical disc 110 at the second rotation speed. Meanwhile, the data accessing rate of the second control module is as high as the data accessing rate of the first control module. Moreover, the first control module adjusts the accessing operation on the data of the first data layer F1 of the optical disc 110 according to the second rotation speed.

In a special situation, the first control module is restrainedly allowed to rotate the optical disc 110 at the lowest rotation speed (e.g., 1 times speed) and the second control module intends to rotate the optical disc 110 at a second rotation speed (e.g., 32 times speed). According to the negotiation signal C, the first control module controls the spindle motor 120 to rotate the optical disc 110 at the lowest rotation speed (i.e., the first rotation speed). Meanwhile, the data accessing rate of the first control module is as low as the data accessing rate of the second control module. Moreover, the second control module adjusts the accessing operation on the data of the second data layer F2 of the optical disc 110 according to the lowest rotation speed.

Generally, after the first control module performs a focusing operation and a tracking-on operation on the first data layer F1 of the optical disc 110, the first control module accesses the data of the first data layer F1. Similarly, after the second control module performs a focusing operation and a tracking-on operation on the second data layer F2 of the optical disc 110, the second control module accesses the data of the second data layer F2.

However, since the double-sided optical disc 110 has no label layer, it is difficult to distinguish the front side from the rear side of the optical disc 110 with the naked eyes. If the optical disc 110 is placed reversely (upside down) and loaded into the optical disc drive 100, the first control module will perform the focusing operation and the tracking-on operation on the second data layer F2 of the optical disc 110 and the second control module will perform the focusing operation and the tracking-on operation on the first data layer F1 of the optical disc 110.

As mentioned above, the spiral direction of the first spiral track T1 of the first data layer F1 and the spiral direction of the second spiral track T2 of the second data layer F2 are opposite to each other. When the spindle motor 120 is rotated in the clockwise direction, the first control module cannot read the data of the second data layer F2 and the second control module cannot read the data of the first data layer F1. After the optical disc drive 100 confirms that the optical disc 110 is placed reversely, the rotating direction of the spindle motor 120 is changed.

That is, after the optical disc drive 100 performs the focusing operation and the tracking-on operation and reads the optical disc 110, the optical disc drive 100 can confirm that the optical disc 110 is placed reversely and change the rotating direction of the spindle motor 120. The process of confirming the reversely-placed optical disc 110 and changing the rotating direction of the spindle motor 120 is time-consuming.

For solving the above drawbacks, the optical disc 110 of the present invention is specially designed. The optical disc 110 has a specified area where a specified information is recorded. Moreover, the present invention also provides a method for judging whether the optical disc 110 is placed reversely by the optical disc drive 100. Consequently, the optical disc drive 100 can quickly confirm the reversely-placed optical disc 110 and change the rotating direction of the spindle motor 120. In an embodiment, the specified area is a burst cutting area, which is also referred as a BCA area. However, as long as the specified information can be accessed by the optical pickup head 130 or 230, the location of the specified area is not restricted.

Figure 3A:
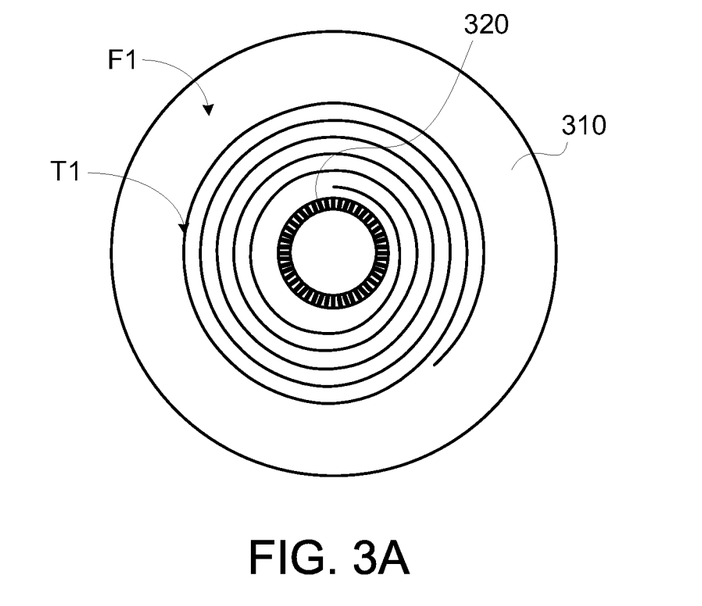
FIG. 3A is a schematic view illustrating a double-sided optical disc according to an embodiment of the present invention.
Figure 3B:
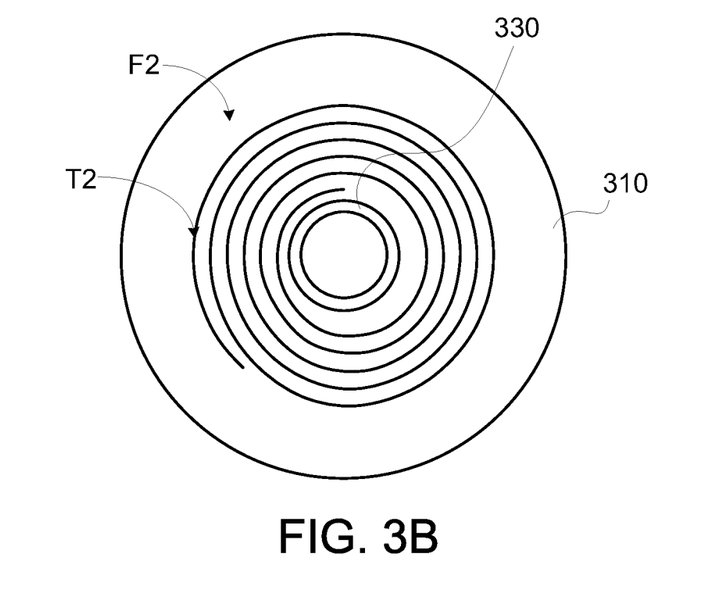
FIG. 3B is a schematic view illustrating the double-sided optical disc of FIG. 3A and taken along another viewpoint.

FIG. 3A is a schematic view illustrating a double-sided optical disc according to an embodiment of the present invention. FIG. 3B is a schematic view illustrating the double-sided optical disc of FIG. 3A and taken along another viewpoint. The double-sided optical disc 310 has a first side and a second side. The first side has a first data layer F1. The second side has a second data layer F2. Moreover, the first data layer F1 has a first spiral track T1, and the second data layer F2 has a second spiral track T2. The spiral direction of the first spiral track T1 and the spiral direction of the second spiral track T2 are opposite to each other. For example, if the first spiral track T1 of the first data layer F1 is a clockwise spiral track, the second spiral track T2 of the second data layer F2 is a counterclockwise spiral track.

Before the double-sided optical disc 310 leaves the factory, the manufacturer records specified information on the BCA region 320 of the first side of the double-sided optical disc 310 with laser light (e.g., YAG laser). In addition, the specified information is not recorded on the BCA region 330 of the second side of the double-sided optical disc 310. For example, the specified information is a barcode information with alternate brightness and darkness lines. Moreover, the barcode information is a previously-written data. In the BCA region 320 of the first data layer F1, the reflectance of locations with the data and the reflectance of the locations without data are different. Consequently, the barcode information with alternate brightness and darkness lines is formed on the BCA region 320 of the first data layer F1. Since the BCA region 320 of the double-sided optical disc 310 contains the barcode information, it means that this side has the first data layer F1. Since the BCA region 330 of the double-sided optical disc 310 does not contain the barcode information, it means that this side has the second data layer F2. In some other embodiments, the BCA region 330 contains the barcode information but the BCA region 320 does not contain the barcode information.

Figure 4:
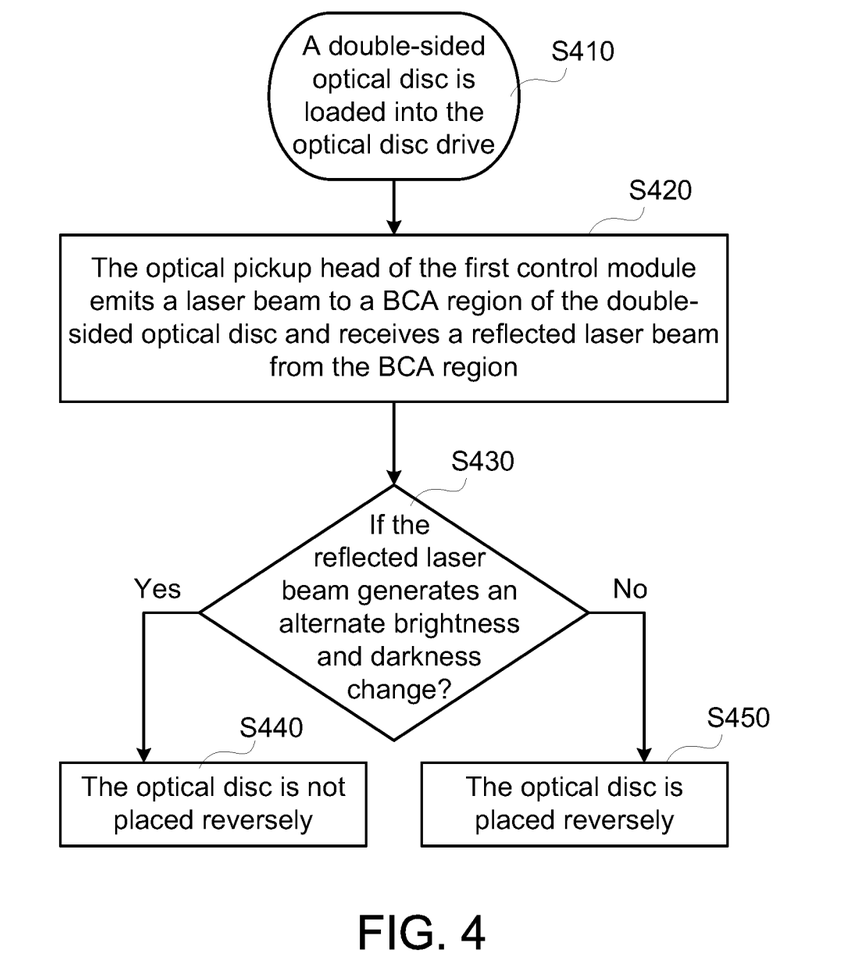
FIG. 4 is a flowchart illustrating a method for judging whether the optical disc is placed reversely according to a first embodiment of the present invention.

FIG. 4 is a flowchart illustrating a method for judging whether the optical disc is placed reversely according to a first embodiment of the present invention. This judging method is applied to an optical disc drive 100 of FIG. 2.

Firstly, a double-sided optical disc is loaded into the optical disc drive (Step S410). Then, the optical pickup head of the first control module emits a laser beam to a BCA region of the double-sided optical disc and receives a reflected laser beam from the BCA region (Step S420). Then, a step S430 is performed to judge whether the reflected laser beam generates an alternate brightness and darkness change.

If the judging condition of the step S430 is not satisfied, the optical disc drive confirms that the double-sided optical disc is placed reversely (Step S450). For accessing the optical disc, the spindle motor of the optical disc drive is rotated in the counterclockwise direction. Then, the first control module performs the focusing operation and the tracking-on operation on the optical disc and accesses the data of the second data layer. In addition, the second control module performs the focusing operation and the tracking-on operation on the optical disc and accesses the data of the first data layer.

If the judging condition of the step S430 is satisfied, the optical disc drive confirms that the double-sided optical disc is not placed reversely (Step S440). For accessing the optical disc, the spindle motor of the optical disc drive is rotated in the default direction (e.g., the clockwise direction). Then, the first control module performs the focusing operation and the tracking-on operation on the optical disc and accesses the data of the first data layer. In addition, the second control module performs the focusing operation and the tracking-on operation on the optical disc and accesses the data of the second data layer.

From the above descriptions, the judging method of the present invention is capable of judging whether the optical disc is placed reversely before the focusing operation and the tracking-on operation are performed. If the optical disc drive confirms that the optical disc is placed reversely, the rotating direction of the spindle motor is correspondingly changed. Consequently, the judging method of the present invention is time-saving.

Moreover, when the laser beam is irradiated on the BCA area with the barcode information, the reflected laser beam generates the alternate brightness and darkness change. After the intensity of the reflected laser beam is processed by the radio frequency amplifier, a sinusoidal wave signal is generated. The sinusoidal wave signal indicates that the alternate brightness and darkness change is generated.

Whereas, when the laser beam is irradiated on the BCA area without the barcode information, the reflected laser beam does not generate the alternate brightness and darkness change. After the intensity of the reflected laser beam is processed by the radio frequency amplifier, a stable direct current (DC) signal is generated. The stable DC signal indicates that the alternate brightness and darkness change is not generated.

Figure 5:
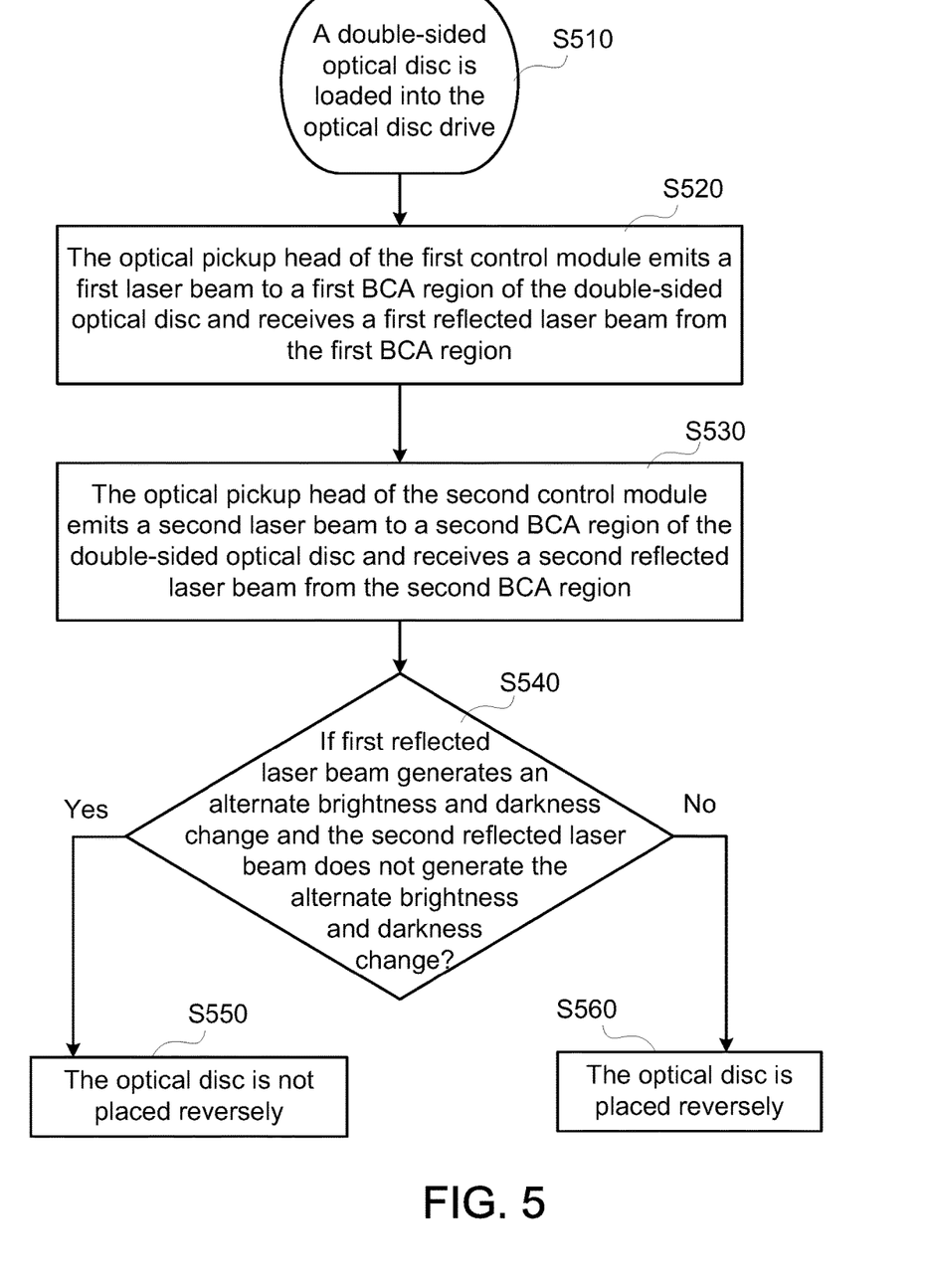
FIG. 5 is a flowchart illustrating a method for judging whether the optical disc is placed reversely according to a second embodiment of the present invention.

FIG. 5 is a flowchart illustrating a method for judging whether the optical disc is placed reversely according to a second embodiment of the present invention. This judging method is applied to an optical disc drive 100 of FIG. 2.

Firstly, the double-sided optical disc is loaded into the optical disc drive (Step S510).

In a step S520, the optical pickup head of the first control module emits a first laser beam to a first BCA region of the double-sided optical disc and receives a first reflected laser beam from the first BCA region.

In a step S530, the optical pickup head of the second control module emits a second laser beam to a second BCA region of the double-sided optical disc and receives a second reflected laser beam from the second BCA region.

Then, a step S540 is performed to judge whether the first reflected laser beam generates an alternate brightness and darkness change and the second reflected laser beam does not generate the alternate brightness and darkness change.

If the judging condition of the step S540 is not satisfied, the optical disc drive confirms that the double-sided optical disc is placed reversely (Step S560). For accessing the optical disc, the spindle motor of the optical disc drive is rotated in the counterclockwise direction. Then, the first control module performs the focusing operation and the tracking-on operation on the optical disc and accesses the data of the second data layer. In addition, the second control module performs the focusing operation and the tracking-on operation on the optical disc and accesses the data of the first data layer.

If the judging condition of the step S540 is satisfied, the optical disc drive confirms that the double-sided optical disc is not placed reversely (Step S550). For accessing the optical disc, the spindle motor of the optical disc drive is rotated in the clockwise direction. Then, the first control module performs the focusing operation and the tracking-on operation on the optical disc and accesses the data of the first data layer. In addition, the second control module performs the focusing operation and the tracking-on operation on the optical disc and accesses the data of the second data layer.

In the above embodiments, the spindle motor can be rotated in two different directions. In some embodiments, the spindle motor can be rotated in a single direction. If the optical disc drive confirms that the double-sided optical disc is placed reversely, the optical disc drive notifies the host that the optical disc is placed reversely. Moreover, through a display screen or a prompt sound, the host notifies the user that it is necessary to turn over the optical disc.

From the above descriptions, the present invention provides an optical disc and a method for judging whether the optical disc is placed reversely in an optical disc drive. The optical disc drive comprises two control modules. Each control module comprises an optical pickup head. After a double-sided optical disc is loaded into the optical disc drive, at least one optical pickup head emits a laser beam to a BCA area of the double-sided optical disc. According to the reflected laser beam, the optical disc drive judges whether the double-sided optical disc is placed reversely.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for judging whether a double-sided optical disc is placed reversely into an optical disc drive, the optical disc drive comprising a first control module which is used to control a first optical pickup head and a second control module which is used to control a second optical pickup head, the first control module comprising the first optical pickup head, a first sled motor, a first radio frequency amplifier, a first driving circuit and a first digital signal processor, the second control module comprising the second optical pickup head, a second sled motor, a second radio frequency amplifier, a second driving circuit and a second digital signal processor, the method comprising steps of:

loading the double-sided optical disc;

allowing the first control module to control the first optical pickup head to emit a first laser beam to a first specified area of the double-sided optical disc and receive a first reflected laser beam from the first specified area;

allowing the second control module to control the second optical pickup head to emit a second laser beam to a second specified area of the double-sided optical disc and receive a second reflected laser beam from the second specified area;

if the first reflected laser beam generates an alternate brightness and darkness change and the intensity of the first reflected laser beam processed by the first radio frequency amplifier generates a sinusoidal wave signal and the second reflected laser beam does not generate the alternate brightness and darkness change and the intensity of the second reflected laser beam processed by the second radio frequency amplifier generates a stable direct current signal, confirming that the double-sided optical disc is not placed reversely; and if the first reflected laser beam does not generate the alternate brightness and darkness change and the intensity of the first reflected laser beam processed by the first radio frequency amplifier generates the stable direct current signal and the second reflected laser beam generates the alternate brightness and darkness change and the intensity of the second reflected laser beam processed by the second radio frequency amplifier generates the sinusoidal wave signal, confirming that the double-sided optical disc is placed reversely.

2. The method as claimed in claim 1, wherein if the optical disc drive confirms that the double-sided optical disc is not placed reversely, the first control module performs a focusing operation and a tracking-on operation on a first side of the double-sided optical disc, and the second control module performs the focusing operation and the tracking-on operation on a second side of the double-sided optical disc.

3. The method as claimed in claim 1, wherein the first specified area is a first burst cutting area, and the second specified area is a second burst cutting area.

4. The method as claimed in claim 3, wherein a first side of the double-sided optical disc comprises the first burst cutting area and a first data layer, and a second side of the double-sided optical disc comprises the second burst cutting area and a second data layer, wherein the first data layer comprises a first spiral track, the second data layer comprise a second spiral track, a spiral direction of the first spiral track and a spiral direction of the second spiral track are opposite to each other, a specified information is recorded on the first burst cutting area, and the specified information is not recorded on the second burst cutting area.

5. The method as claimed in claim 4, wherein the specified information is a previously-written data, which contains a barcode information with alternate brightness and darkness lines.

6. The method as claimed in claim 1, wherein if the optical disc drive confirms that the double-sided optical disc is not placed reversely, the double-sided optical disc is rotated in a first direction, wherein if the optical disc drive confirms that the double-sided optical disc is placed reversely, the double-sided optical disc is rotated in a second direction.

* * * * *